(12) United States Patent
Liu et al.

(10) Patent No.: US 10,702,826 B2
(45) Date of Patent: Jul. 7, 2020

(54) METHOD AND APPARATUS FOR INCREASING MASS TRANSFER IN AQUEOUS GAS ADSORPTION PROCESSES

(71) Applicant: University of Kentucky Research Foundation, Lexington, KY (US)

(72) Inventors: Kunlei Liu, Lexington, KY (US);
Leland R. Widger, Lexington, KY (US); Zhen Fan, Lexington, KY (US); Joshuah Stolaroff, Lexington, KY (US)

(73) Assignee: UNIVERSITY OF KENTUCKY RESEARCH FOUNDTION, Lexington, KY (US)

( * ) Notice: Subject to any disclaimer, the term of this patent is extended or adjusted under 35 U.S.C. 154(b) by 0 days.

(21) Appl. No.: 16/216,205

(22) Filed: Dec. 11, 2018

(65) Prior Publication Data

US 2019/0176080 A1    Jun. 13, 2019

Related U.S. Application Data

(60) Provisional application No. 62/597,479, filed on Dec. 12, 2017.

(51) Int. Cl.
| | | |
|---|---|---|
| B01D 53/40 | (2006.01) | |
| B01D 53/18 | (2006.01) | |
| B01D 53/78 | (2006.01) | |
| B01D 53/96 | (2006.01) | |
| B01D 15/30 | (2006.01) | |
| B01D 15/32 | (2006.01) | |
| B01D 53/14 | (2006.01) | |
| B01J 19/32 | (2006.01) | |

(52) U.S. Cl.
CPC ..... *B01D 53/1475* (2013.01); *B01D 53/1493* (2013.01); *B01D 53/18* (2013.01); *B01J 19/32* (2013.01); *B01D 15/305* (2013.01); *B01D 15/327* (2013.01); *B01D 2257/504* (2013.01); *B01D 2325/36* (2013.01); *B01D 2325/38* (2013.01)

(58) Field of Classification Search
None
See application file for complete search history.

(56) References Cited

U.S. PATENT DOCUMENTS

| | | | |
|---|---|---|---|
| 4,335,001 | A | 6/1982 | Aurelle et al. |
| 4,471,014 | A | 9/1984 | den Hartog et al. |
| 4,514,377 | A | 4/1985 | Symons et al. |

(Continued)

FOREIGN PATENT DOCUMENTS

| | | | |
|---|---|---|---|
| EP | 0374873 | A2 | 6/1990 |
| EP | 2228118 | A1 | 9/2010 |

(Continued)

OTHER PUBLICATIONS

US 5,352,577 A1, 03/2002, Martin et al. (withdrawn)

(Continued)

*Primary Examiner* — Daniel Berns
(74) *Attorney, Agent, or Firm* — King & Schickli, PLLC

(57) ABSTRACT

A method of removing and capturing an acid gas from a fluid stream includes exposing the fluid stream to an aqueous scrubbing solution in the presence of a packing element including alternating hydrophobic and hydrophilic features or zones. A related apparatus is also disclosed.

7 Claims, 5 Drawing Sheets

(56) References Cited

U.S. PATENT DOCUMENTS

| | | |
|---|---|---|
| 4,999,172 A | 3/1991 | Simons |
| 5,672,422 A | 9/1997 | Kanda et al. |
| 5,792,244 A | 8/1998 | Morlec et al. |
| 7,128,881 B2 | 10/2006 | Petrik |
| 7,153,421 B2 | 12/2006 | Koehler et al. |
| 7,361,278 B2 | 4/2008 | Yamazaki et al. |
| 7,507,277 B2 | 3/2009 | Lawrence et al. |
| 8,650,013 B2 | 2/2014 | Hanley |
| 8,746,660 B2 | 6/2014 | Ausner et al. |
| 8,944,417 B2 | 2/2015 | Ausner et al. |
| 9,279,435 B2 | 3/2016 | Bohringer et al. |
| 9,545,598 B2 | 1/2017 | Pellegrin et al. |
| 2019/0240616 A1* | 8/2019 | Eliseev ............... B01D 53/228 |

FOREIGN PATENT DOCUMENTS

| | | |
|---|---|---|
| JP | H02207837 A | 8/1990 |
| JP | 2012030222 A | 2/2012 |

OTHER PUBLICATIONS

EP2228118 A1 English Machine Translation.
JP2012030222 A English Machine Translation.
JPH02207837A English Machine Translation.

\* cited by examiner

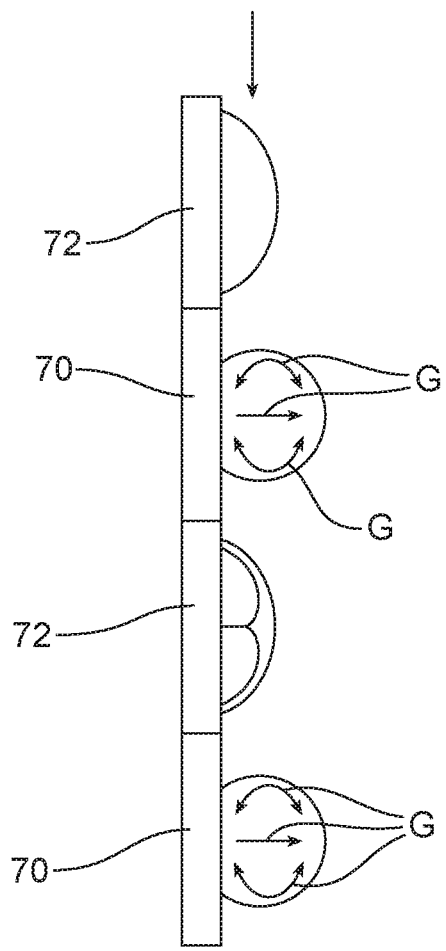

METHOD AND APPARATUS FOR INCREASING MASS TRANSFER IN AQUEOUS GAS ADSORPTION PROCESSES

This application claims priority to U.S. Provisional Patent Application 62/597,479, filed Dec. 12, 2017, the content of which is hereby incorporated by reference in its entirety.

TECHNICAL FIELD

This document relates generally to the separation of acid gases from a fluid stream and, more particularly, to a new and improved method and apparatus for that purpose.

BACKGROUND

The cleanup of acid gases, such as $CO_2$, from natural gas has been an extensively practiced technology. The industrial removal of $CO_2$ from natural gas dates back to the 1930's. While several technologies exist for the removal of acid gases, one of the most commonly employed practices is the use of aqueous amines. In this process the amine reacts with the $CO_2$ to form a carbamate or bicarbonate salt along with a protonated amine to balance the overall charge. The liquid, $CO_2$ rich amine from the bottom of the absorber, is then passed through a heat exchanger to improve efficiency before being heated to a higher temperature in a stripper. The stripper removes the $CO_2$ as a gas from the amine solution to produce a lean, or $CO_2$ deficient solution. The lean solution is returned to the absorber by way of the heat exchanger to repeat the process.

The application of $CO_2$ capture and storage (CCS) to post-combustion flue gas separation has recently been an area of major interest. Due to the maturity of aqueous amine carbon capture systems, this technology will be the preferred method when new regulations require widespread full-scale deployment of post-combustion CCS for reducing emissions from fossil fuel combustion.

With continued societal and regulatory concern over the global climate change, the market has been driving the post-combustion capture technology development towards commercial scale. However, there is still a need for significant technological advancements and cost reduction strategies to make these systems cost-competitive. Full scale implementation of current carbon capture systems is estimated to increase the overall cost of electricity by 85% ($66/ton $CO_2$ captured) over a twenty-year levelized cost, with the largest contributing factor being the capital cost to build the absorber tower. Absorber tower height is directly related to the $CO_2$ absorption rate that is influenced by reaction kinetics, active gas-liquid contact surface, and $CO_2$ driving force. There has been significant effort toward increasing the mass transfer ($K_G$) of $CO_2$ in the absorber by selecting fast kinetic solvent, intensifying gas/liquid mixing and modifying solvent properties to improve the effectiveness of gas-liquid contact surface.

This document relates to a new and improved method and apparatus for increasing mass transfer in gas separation processes that utilize aqueous solvents with a custom packing material that is designed to increase turbulent liquid flow then freshen the gas-liquid interface with unreacted bulk chemicals, which is known to increase overall $K_G$. With an enhanced $K_G$ or absorption rate, the residence time to reach target capture efficiency will be decreased, requiring a shorter absorber tower and a lower capital cost. In addition, higher solvent loadings may be reached to reduce the requirement of $CO_2$ stripping carry gas with increased mass transfer thereby lowering stripper energy requirements.

Advantageously the new and improved method and apparatus are applicable to any solvent based gas separation process, including post combustion $CO_2$ capture, where mass transfer is limited by physical diffusion.

SUMMARY

One of the major barriers to increasing mass transfer in amine solvent systems is the formation of a stable layer, or film, at the gas/liquid interface where $CO_2$ adsorption occurs. As the amine solvent loads, the rich solvent has a higher viscosity relative to the lean solution, limiting $CO_2$ diffusivity then mass transfer by decreasing turbulence and decreasing concentration of free amine at the interface where adsorption occurs. To counteract this phenomenon, the new and improved method and apparatus provide turbulent force from within the bulk solution for surface renewal, using the inherent hydrophilicity of the solvent itself on the patterned polarity packing surface, to destabilize this stable film and bring fresh amine from the bulk to the surface.

The new and improved method and apparatus may be used as an alternative to, or in conjunction with, other turbulence enhancing technologies to increase mass transfer and lower cost for gas separation in packed column processes. The dynamic polarity packing provides a similar function as heterogeneous additives, renewing the solvent surface, while eliminating possible process drawbacks and gain more benefits from the diffusion resistance elimination.

In accordance with the purposes and benefits described herein, the new and improved method of removing and capturing an acid gas from a fluid stream comprises exposing the fluid stream to an aqueous scrubbing solution in the presence of a packing element including a hydrophobic feature and a hydrophilic feature in order to increase gas-liquid mixing and then the rate of acid gas absorption.

The method may include the step of establishing a counterflow between the fluid stream and the aqueous scrubbing solution within an absorber vessel. The method may also include the step of recovering the acid gas captured by the aqueous scrubbing solution and regenerating the aqueous scrubbing solution.

In one or more of the many possible embodiments of the method, the method may include the step of providing the packing element with a surface including the hydrophobic feature and the hydrophilic feature. Further, the method may include fixing the packing element within the absorber vessel. In addition, the method may include providing the surface of the packing element with alternating hydrophobic zones and hydrophilic zones. Those zones may be patterned.

In one or more of the many possible embodiments, the hydrophobic zones have a width of between 1 mm and 100 mm. In one or more of the many possible embodiments, the hydrophilic zones have a width of between 1 mm and 100 mm. The method may also include providing a hydrophobic zone at an edge of the packing element.

In at least one of the many possible embodiments of the method, the method includes the step of providing the hydrophobic zones on a hydrophilic plate. In at least one of the many possible embodiments of the method, the method includes the step of providing the hydrophilic zones on a hydrophobic plate.

In any embodiments of the method, the fluid stream may comprise a flue gas, such as is produced by an electric power station. The acid gas may comprise carbon dioxide. The aqueous scrubbing solution may include an aqueous amine for carbon capture.

In accordance with an additional aspect, a new and improved apparatus is provided for removing and capturing an acid gas from a fluid stream. That apparatus comprises (a) an absorber vessel, such as an absorber tower, having a chamber and (b) a packing element in the chamber. That packing element has a hydrophobic feature and a hydrophilic feature wherein the hydrophobic feature has a first width of between 1 mm and 100 mm and the hydrophilic feature has a second width of between 1 mm and 100 mm.

In one or more of the many possible embodiments of the apparatus, the packing element is fixed within the chamber of the absorber vessel. Further, the absorber vessel includes a first inlet for the fluid stream and a second inlet for the aqueous scrubber solution wherein the first and second inlets are opposed to establish a counterflow of the fluid stream and the aqueous scrubber solution. The counterflow may be provided along a longitudinal axis of the absorber vessel and the packing element may extend across the longitudinal axis.

In one or more of the many possible embodiments, the packing element is a body and the hydrophobic feature and the hydrophilic feature comprise alternating hydrophobic zones and hydrophilic zones along the surface of the body. Those zones may be presented in a pattern. Further, the edge of the body is hydrophobic.

In one or more of the many possible embodiments, the packing element is a hydrophobic plate and the hydrophilic features are hydrophilic zones provided at spaced locations along the hydrophobic plate. In one or more of the many possible embodiments, the packing element is a hydrophilic plate and the hydrophobic features are hydrophobic zones provided at spaced locations along the hydrophilic plate.

In the following description, there are shown and described several preferred embodiments of the method and apparatus. As it should be realized, the method and apparatus are capable of other, different embodiments and their several details are capable of modification in various, obvious aspects all without departing from the method and apparatus as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the method and apparatus and together with the description serve to explain certain principles thereof.

FIG. 5 is a detailed schematic illustration of a droplet of aqueous scrubbing solution flowing down a packing element incorporating alternating hydrophobic and hydrophilic zones.

Reference will now be made in detail to the present preferred embodiments of the method and apparatus, examples of which are illustrated in the accompanying drawing figures.

DETAILED DESCRIPTION

Figure 1:
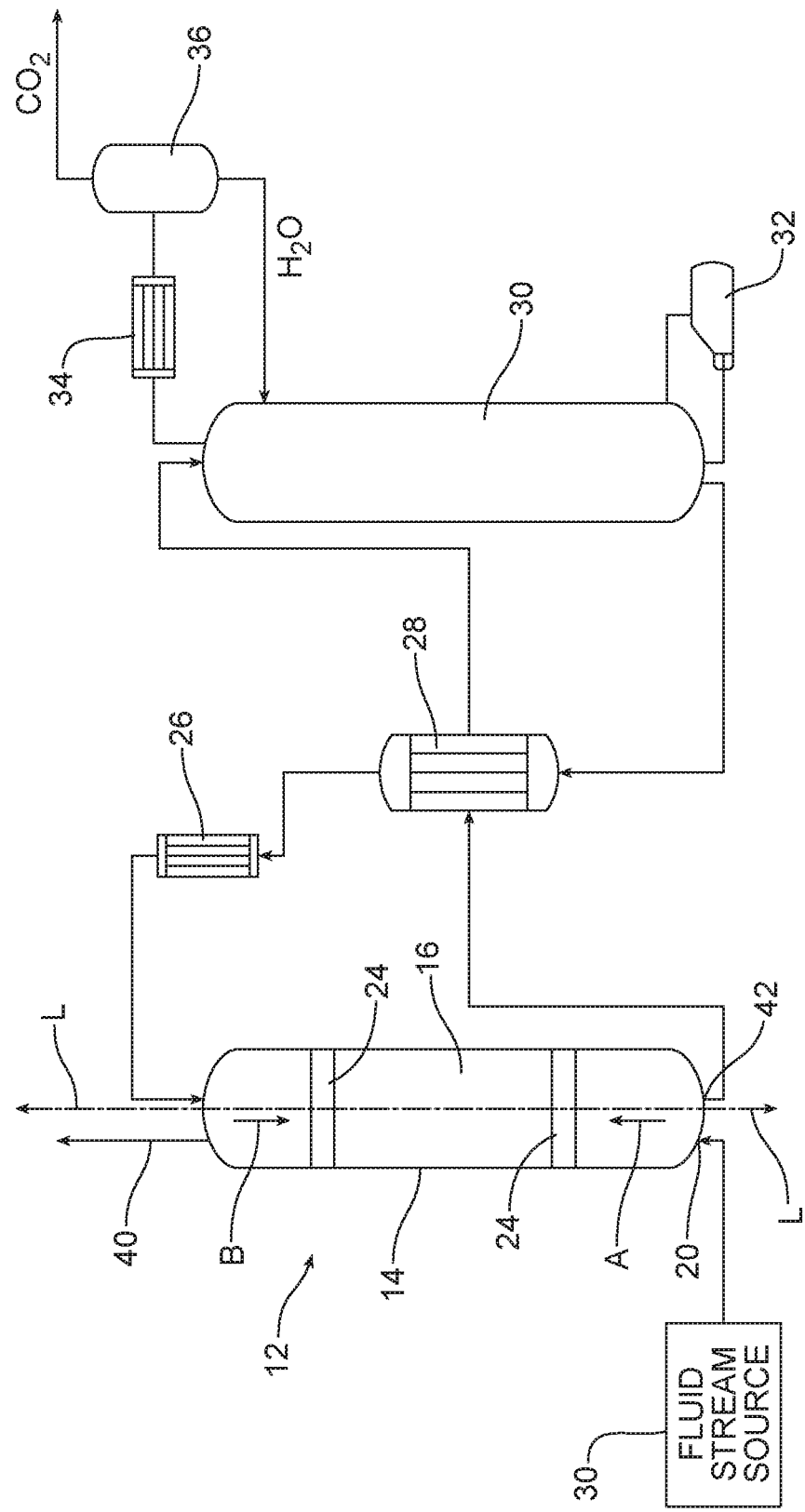
FIG. 1 is a schematic block diagram of a carbon capture system incorporating the new and improved apparatus.

Reference is now made to FIG. 1 which schematically illustrates a carbon capture system 10 of the type utilized to remove and capture carbon dioxide from a flue gas. As illustrated, the carbon capture system 10 includes a new and improved apparatus 12 including an absorber vessel 14, having an internal chamber 16.

The absorber vessel 14 may be in the form of an absorber tower that has a longitudinal axis L oriented in a vertical direction. The absorber vessel 14 includes a first inlet 20 adjacent the lowermost end and a second inlet 22 adjacent the uppermost end. The two inlets 20, 22 are opposed so as to establish a counterflow within the chamber 16.

At least one packing element 24 is held in the chamber 16. As depicted in FIG. 1, two packing elements 24 are illustrated but more could be provided. The packing elements 24 are fixed within the chamber 16 of the absorber vessel 14 and extend across the longitudinal axis L. The packing elements 24 will be described in greater detail below.

The carbon capture system 10 also includes a cooler 26, a heat exchanger 28, a stripper 30, a reboiler 32, a condenser 34 and a gas-liquid separator 36.

A fluid stream source 38 generates a fluid stream, in the form of gas, that is delivered to the absorber vessel 14 through the first inlet 20. That fluid stream flows upward in the direction of action arrow A through the chamber 16 of the absorber vessel 14. Simultaneously, a $CO_2$ lean aqueous scrubbing solution is delivered to the absorber vessel 14 through the second inlet 22. The aqueous scrubbing solution flows downward in the direction of action arrow B through the chamber 16 of the absorber vessel 14.

The aqueous scrubbing solution is adapted to remove an acid gas, in this case carbon dioxide, from the fluid stream. Toward this end, the aqueous scrubbing solution may include an aqueous amine such as, for example, monoethanolamine (MEA), hexanediamine (HAD), N,N-Bis(2-hydroxyethyl)methyl-amine (MDEA), piperazine (PZ), 2-amino-2-methyl propanol (AMP) or combinations thereof. As is known in the art, the aqueous scrubbing solution in addition to water, may also include other appropriate additives including, for example, corrosions inhibitors, solvent oxidation inhibitors and foaming inhibitors.

Following reaction, the gaseous fluid stream, minus carbon dioxide, is exhausted from the top of the absorber vessel at 40. The now $CO_2$-rich aqueous scrubbing solution is discharged at 42 from the bottom of the absorber vessel 14 and routed to the heat exchanger 28 before being routed to the top of the stripper 30. The aqueous scrubbing solution at the bottom of the stripper 30 is circulated through the reboiler 32 where it is heated and then returned to the stripper. The $CO_2$-rich aqueous scrubbing solution entering the top of the stripper 30 is heated in the stripper 30, causing the release of the $CO_2$ and regeneration of the $CO_2$-lean aqueous scrubbing solution.

The released $CO_2$ and some water vapor is exhausted from the top of the stripper 30 and delivered to the gas-liquid separator 36. The separated $CO_2$ is collected for further processing or long term storage while the separated water is returned to the stripper 30. The $CO_2$-lean aqueous scrubbing solution, regenerated in the scrubber 30, is then returned through the heat exchanger 28 and the cooler 26 to the absorber vessel 14 through the second inlet 22 in order to restart the process cycle.

One of the major barriers to enabling mass transfer to amine solvent systems is the formation of a stable layer or film at the gas/liquid interface where $CO_2$ adsorption occurs. For many second generation advanced solvents with low heat of absorption, it has been reported that overall mass transfer is limited by diffusion of $CO_2$ from the reaction gas-liquid interface film into the bulk liquid, and/or diffusion of the unreacted amine from the bulk liquid to the interface liquid film.

Figure 2:
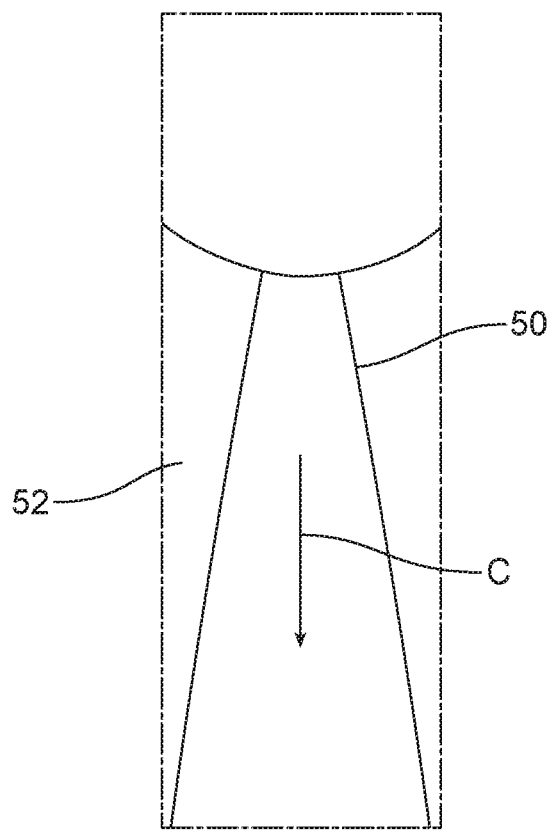
FIG. 2 is a detailed perspective view illustrating how an aqueous scrubbing solution of the type utilized in the absorber vessel of the new and improved apparatus flows down the smooth surface of a hydrophilic material.
Figure 3:
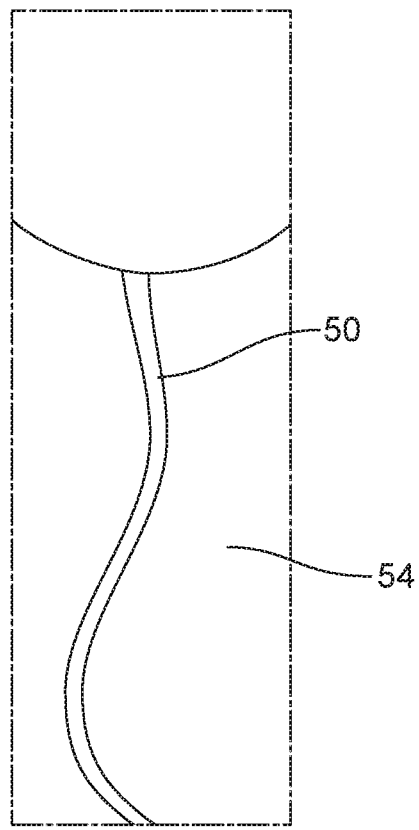
FIG. 3 is a detailed perspective view illustrating how an aqueous scrubbing solution of the type utilized in the absorber vessel of the new and improved apparatus flows down the smooth surface of a hydrophobic material.

As illustrated in FIGS. 2 and 3, hydrophilic and hydrophobic surfaces display distinct wettability and contact angle characteristics when interacting with aqueous solutions. When the aqueous scrubbing solution 50 flows in the direction of action arrow C down a surface 52 made from a hydrophilic material, the contact angle increases and the aqueous scrubbing solution spreads outward over the surface. See FIG. 2. In contrast, when the aqueous scrubbing solution 50 flows in the direction of action arrow D down a surface 54 made from a hydrophobic material, the contact angle decreases and the aqueous scrubbing solution draws up upon itself, flowing in a tight rivulet.

The packing element 24 described in detail below, takes advantage of the behavior illustrated in FIGS. 2 and 3 to provide a significant benefit in the form of increased mixing that directly addresses the major barriers noted above and results in increased $CO_2$ mass transfer.

More particularly, the packing element 24 may comprise a dynamic polarity structured packing. As illustrated in detail in FIG. 4, the packing element 24 may include a plurality of random packing and corrugated metal sheets or plates 60, 62, 64 that provide a very open honeycomb structure with inclined flow channels 66 providing a relatively high surface area but low resistance to vapor flow.

Figure 4:
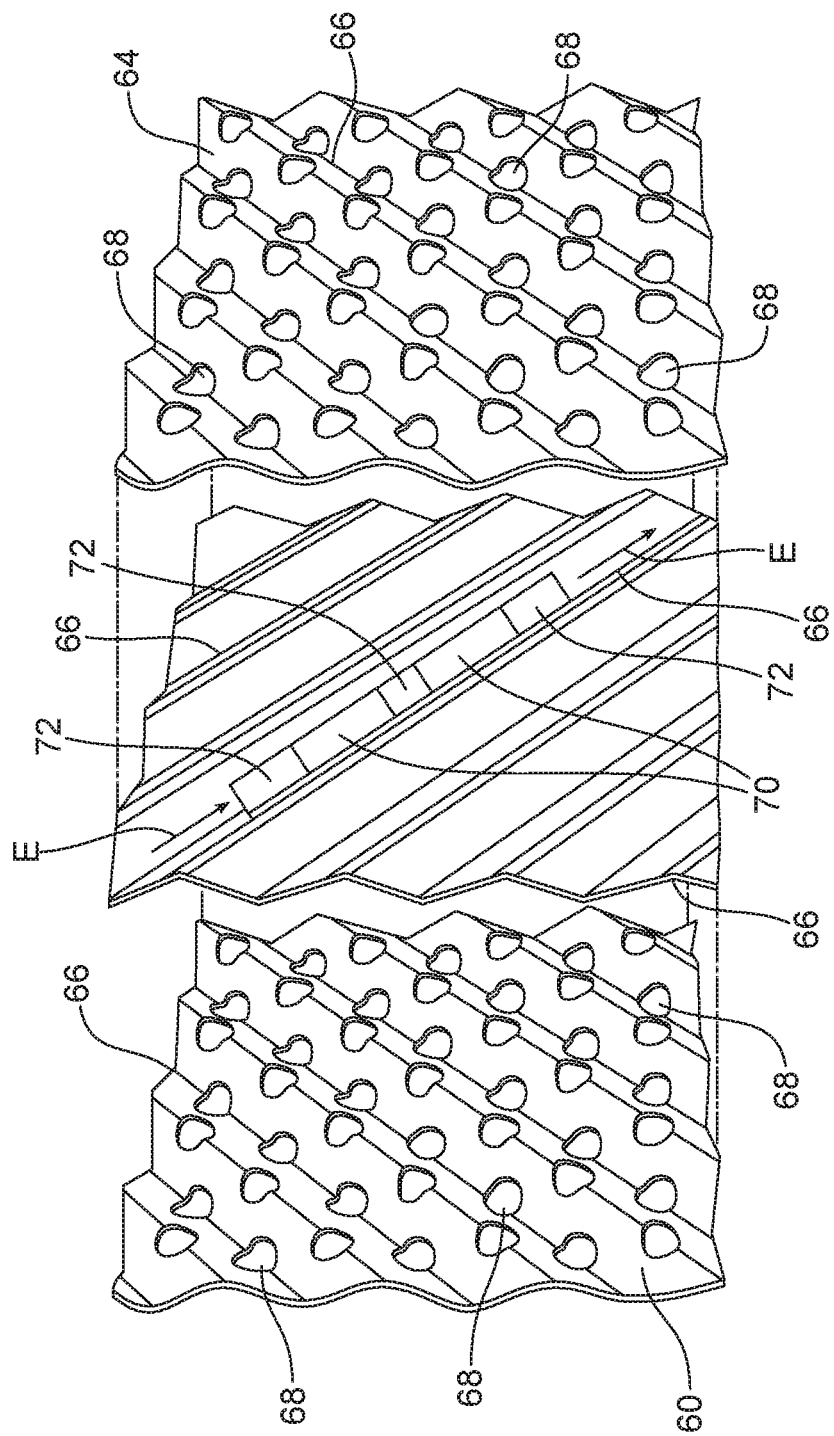
FIG. 4 is a partially-exploded, detailed perspective view of one possible embodiment of a packing element used in the apparatus set forth in FIG. 1.

In the embodiment illustrated in detail in FIG. 4, structured packing, the first corrugated plate 60 and the third corrugated plate 64 include a plurality of openings or perforations 68 for aiding liquid and vapor counterflow. The center plate 62 of the illustrated embodiment does not include any openings or perforations and thus, the flow channels 66 of plate 62 are uninterrupted. As schematically illustrated in FIG. 4, the flow channels 66 of at least plate 62 have a hydrophobic feature 70 and a hydrophilic feature 72 in the form of alternating hydrophobic and hydrophilic zones. Each hydrophobic feature or zone 70 has a width or length dimension of between 1 mm and 100 mm. Similarly, each hydrophilic feature or zone 72 has a width or length dimension of between 1 mm and 100 mm. The width or length dimension is oriented across the flow path followed by the aqueous scrubbing solution (see action arrows E) which is counter to the flow path of the fluid stream/flue gas (see action arrow F).

In the embodiment illustrated in FIG. 4, the hydrophobic features or zones 70 have a greater width or length than the hydrophilic features or zones 72. Here it should be appreciated that in alternative embodiments, the hydrophobic features or zones 70 could be of the same width or length as the hydrophilic features or zones 72. In other alternative embodiments, the hydrophilic features or zones 72 could have a greater width or length than the hydrophobic features or zones 70. It should also be noted that the hydrophobic features or zones 70 and the hydrophilic features or zones 72 may be provided in a pattern or a random arrangement of widths and lengths. While not schematically illustrated in FIG. 4, the flow channels 66 of the plates 60 and 64 may also include alternating hydrophobic features or zones 70 and hydrophilic features or zones 72 as just described.

FIG. 5 schematically illustrates the effect the alternating hydrophobic features or zones 70 and the hydrophilic features or zones 72 have on the aqueous scrubbing solution 50 as it flows down the plates 60, 62, 64 over those alternating zones. As the aqueous scrubbing solution 50 flows over each hydrophilic feature or zone 72, it flattens and spreads outward. In contrast, as the aqueous scrubbing solution 50 flows over each hydrophobic feature or zone 70, it draws up upon itself. The change in contact angle between the aqueous scrubbing solution and each alternating hydrophilic feature or zone 72 and each hydrophobic feature or zone 70 disrupts the steady flow pattern and creates internal turbulence and mixing in the aqueous solution (note action arrows G).

This action serves to break the stable film layer and the gas/liquid interface thereby renewing the surface of the aqueous scrubbing solution with unreacted amine for enhanced mass transfer and $CO_2$ capture. This directly leads to a reduced cost to capture $CO_2$ from a utility fossil-fuel-fired unit with minimum secondary environmental impact.

The packing element 24 with the alternating hydrophobic features/zones 70 and the hydrophilic features/zones 72 may be fabricated with additive manufacturing (aka 3D printing) to produce a three dimensional structure. Briefly, the design of the three dimensional packing element 24 is sliced into layers and a toolpath is set to produce each layer from a single nozzle. Plastic filament is extruded through a nozzle designed to melt the material. After deposition through the nozzle, the lower temperature re-solidifies the plastic into the desired design. Fused deposition modeling could be used to print the dynamic packing element 24 with a diameter of, for example, 7.5 to 10.0 cm.

In one possible embodiment of the packing element 24, hydrophobic features or zones 70 are provided or printed at spaced locations onto a plate made of hydrophilic material. In another possible embodiment of the packing element 24, hydrophilic features or zones 72 are provided or printed at spaced locations on a plate made from hydrophobic material.

In some embodiments the lower edge or even all edges of the plate incorporate or provide a hydrophobic feature or zone 70 to destabilize the liquid film and aid in the liquid film breaking away from the packing element.

There are many materials available with varied hydrophobicity and hydrophilicity that may be selected for construction of the packing element 24 based upon the specific application and the aqueous scrubbing solution being utilized. A partial list of useful materials includes (a) hydrophobic polymers, such as polyurethane, polyethylene, polyolefin, polyacrylate, polystyrene, polypropylene and polytetrafluoroethylene and copolymers and combinations thereof for the hydrophobic features or zones 70 and steel, ceramic and hydrophilic polymers, such as functionalized poly(maleic anhydride), polyether, poly(vinyl alcohol), poly (vinylpyrrolidone), polyoxymethylene, poly(lactic acid), and poly(methyl methacrylate) and copolymers and combinations thereof for the hydrophilic features or zones 72.

The apparatus 12 described above is useful in a method of removing and capturing an acid gas from a fluid stream. That method may be broadly described as including the step of exposing the fluid stream to an aqueous scrubbing solution in the presence of a packing element 24 including a hydrophobic feature 70 and a hydrophilic feature 72 in order to increase gas-liquid mixing and then the rate of acid gas absorption.

As illustrated in FIG. 1 and described above, the method may also include the step of establishing a counterflow between the fluid stream and the aqueous scrubbing solution within an absorber vessel 14. Further, the method may include the steps of recovering the acid gas captured by the aqueous scrubbing solution and regenerating the aqueous scrubbing solution.

In at least some embodiments, the method may include the step of providing a packing element with a surface including the hydrophobic feature or zone 70 and the hydrophilic feature or zone 72. More particularly, the method may include providing the surface of the packing element with alternating hydrophobic features/zones 70 and hydrophilic features/zones 72 provided on a micron to millimeter scale. In at least some embodiments, the hydrophobic features or zones 70 have a width or length of 1 mm to 100 mm. In at least some embodiments, the hydrophilic features or zones 72 have a width or length of 1 mm to 100 mm.

The method may include the step of fixing the packing element within the chamber 16 of the absorber vessel 14. The method may include the step of providing a hydrophobic feature or zone 70 at an edge of the packing element 34. The method may also include providing hydrophobic zones 70 on a hydrophilic plate. In other possible embodiments, the method may include providing hydrophilic zones 72 on a hydrophobic plate.

While the method is useful in removing and capturing substantially any acid gas from a fluid stream, it should be appreciated that it is particularly useful in removing and capturing carbon dioxide from a fossil-fuel combusted flue gas with an aqueous scrubbing solution including an aqueous amine.

Numerous benefits and advantages are provided by the new and improved method and apparatus 12. As the aqueous scrubbing solution moves over the alternating hydrophobic features or zones 70 and the hydrophilic features or zones 72, the aqueous scrubbing solution changes flow pattern resulting in increased internal mixing to form a dynamically refreshing and reactive liquid-gas interface. Aqueous scrubbing solution turbulence, available surface area and mass transfer are all dramatically increased. That has the effect of dramatically decreasing the required residence time in the absorber vessel. Consequently, the absorber vessel or tower 14 may be reduced in height at great capital cost savings.

The foregoing has been presented for purposes of illustration and description. It is not intended to be exhaustive or to limit the embodiments to the precise form disclosed. Obvious modifications and variations are possible in light of the above teachings. For example, FIGS. 1 and 4 illustrate a structured packing element 34. It should also be appreciated that the packing element may be random instead of structured. All such modifications and variations are within the scope of the appended claims when interpreted in accordance with the breadth to which they are fairly, legally and equitably entitled.

What is claimed:

1. A method of removing and capturing an acid gas from a fluid stream, comprising:
counterflowing the fluid stream against an aqueous scrubbing solution in an absorber with a packing element within, wherein the packing element comprises a first corrugated plate, a second corrugated plate and a third corrugated plate with flow channels in a stacked arrangement, the first and third corrugated plates each having perforations, wherein the second corrugated plate does not include perforations and comprises on a surface of a flow channel alternating hydrophobic and hydrophilic zones such that liquid flowing through the flow channel of the second corrugated plate creates internal turbulence in order to form a dynamically refreshing and reactive liquid-gas interface and capture acid gas from the fluid stream.

2. The method of claim 1 including recovering the acid gas captured by the aqueous scrubbing solution and regenerating the aqueous scrubbing solution.

3. The method of claim 2 wherein the fluid stream is flue gas and the acid gas is carbon dioxide.

4. The method of claim 1, including providing said hydrophobic zones on a surface of the packing element with a width or length of between 1 mm and 100 mm.

5. The method of claim 4, including providing said hydrophilic zones on a surface of the packing element with a width or length of between 1 mm and 100 mm.

6. The method of claim 5, including providing a hydrophobic zone at an edge of the packing element.

7. The method of claim 6, wherein the fluid stream is a flue gas, the acid gas is carbon dioxide and the aqueous scrubbing solution includes an aqueous amine for carbon capture.

* * * * *